(12) United States Patent
Piontek

(10) Patent No.: US 8,167,324 B2
(45) Date of Patent: May 1, 2012

(54) CASTER WHEEL SUSPENSION FOR A ZERO-TURN MOWER

(75) Inventor: Alan F. Piontek, Lincoln, NE (US)

(73) Assignee: Great Plains Manufacturing, Inc., Salina, KS (US)

( * ) Notice: Subject to any disclaimer, the term of this patent is extended or adjusted under 35 U.S.C. 154(b) by 94 days.

(21) Appl. No.: 12/761,926

(22) Filed: Apr. 16, 2010

(65) Prior Publication Data
US 2011/0254241 A1 Oct. 20, 2011

(51) Int. Cl.
*B60G 9/02* (2006.01)
*B60G 15/02* (2006.01)

(52) U.S. Cl. ............ 280/124.111; 280/124.113; 16/44; 16/45

(58) Field of Classification Search ........... 280/124.111, 280/124.113, 124.125, 124.128, 124.131, 280/124.141, 124.142, 124.146, 124.154, 280/124.164, 124.179, 89.11; 16/20, 44, 16/45; 188/1.12; 267/169, 174, 178, 289; 56/11.5, 14.7, 16.7, 17.5
See application file for complete search history.

(56) References Cited

U.S. PATENT DOCUMENTS

| | | | |
|---|---|---|---|
| 1,786,974 A | 12/1930 | Abbe | |
| 2,155,521 A * | 4/1939 | Zavarella | 280/124.127 |
| 2,209,804 A * | 7/1940 | Edwin | 180/209 |
| 2,347,524 A | 4/1944 | Swan | |
| 2,577,244 A * | 12/1951 | Hedgpeth | 16/44 |
| 3,101,131 A * | 8/1963 | Bourcier et al. | 188/320 |
| 3,270,367 A | 9/1966 | Loos | |
| 3,792,748 A * | 2/1974 | Regier | 180/41 |
| 4,685,174 A | 8/1987 | Hager | |
| 5,248,011 A | 9/1993 | Richards | |
| 5,308,091 A * | 5/1994 | Mihalcin | 277/636 |
| 5,355,664 A | 10/1994 | Zenner | |
| 6,062,333 A * | 5/2000 | Gordon | 180/311 |
| 6,149,169 A | 11/2000 | Chelgren | |
| 6,357,077 B1 * | 3/2002 | Jones et al. | 16/44 |
| 6,394,216 B1 * | 5/2002 | Gordon | 180/311 |
| 6,425,161 B1 | 7/2002 | LeMeur, Jr. et al. | |
| 6,460,318 B1 | 10/2002 | Ferris et al. | |
| 6,510,678 B2 | 1/2003 | Ferris et al. | |
| 6,513,822 B1 * | 2/2003 | Chonan | 280/276 |
| 6,557,330 B2 | 5/2003 | Hubscher | |
| 6,698,172 B2 | 3/2004 | Ferris et al. | |
| 7,065,827 B2 * | 6/2006 | Hsiao | 16/44 |
| 7,093,319 B2 | 8/2006 | Lemeur, Jr. et al. | |
| 7,107,746 B2 * | 9/2006 | Melone et al. | 56/15.8 |
| 7,374,187 B2 | 5/2008 | Melone et al. | |
| 7,546,723 B2 | 6/2009 | Melone et al. | |
| 7,610,739 B2 * | 11/2009 | Godfrey | 56/15.6 |
| 7,850,180 B2 * | 12/2010 | Wilcox | 280/124.103 |
| 7,866,671 B2 * | 1/2011 | Madler | 280/6.154 |
| 7,882,914 B2 * | 2/2011 | Scheele et al. | 180/89.14 |
| 7,967,306 B2 * | 6/2011 | Mighell | 280/124.103 |
| 2008/0190084 A1 | 8/2008 | Piontek | |
| 2009/0033054 A1 * | 2/2009 | Foster | 280/124.1 |

* cited by examiner

*Primary Examiner* — Joseph Rocca
(74) *Attorney, Agent, or Firm* — Hovey Williams LLP

(57) ABSTRACT

A zero-turn mower comprising a zero-turn mower frame, a front axle coupled to the zero-turn mower frame, first and second caster wheel assemblies, and first and second front shock assemblies. The front shock assemblies rotatably and telescopically couple the caster wheel assemblies to the front axle, thereby providing vertical shock absorption. The front axle may be a floating axle that is pivotably coupled to the mower frame and/or the shock assemblies may define an internal spring-receiving chamber that is substantially isolated from the external environment. Such a zero-turn mower may provide a smoother ride and may require less maintenance and repair than conventional zero-turn mowers.

26 Claims, 6 Drawing Sheets

CASTER WHEEL SUSPENSION FOR A ZERO-TURN MOWER

BACKGROUND

1. Field

The present invention relates to a caster wheel suspension system for zero-turn riding lawn mowers.

2. Related Art

Zero-turn mowers are designed to have a turning radius that is essentially zero inches. Zero-turn mowers typically have two large tires in the back, and two caster wheels in the front. The motor and transmission of the mower allows the back tires to rotate forwards and backwards independently of one another for maximum maneuverability.

Zero-turn mowers can experience a great amount of wear and tear due to jolting and uneven weight distribution on its wheel assemblies and frame caused by driving over bumps or dips in the ground, particularly if one front tire passes over a bump or dip while the other tire does not. Some zero-turn mowers have springs placed between a front axle to which the front caster wheels are attached and a frame of the mower to dampen the effects of these jolts. However, these springs are generally open to the surrounding environment and therefore subject to build up of grass, dirt, or other foreign contaminates and may be susceptible to rusting. Additionally, the springs between the frame and the front axle are not always sufficient in addressing jolting between the caster wheels and the front axle.

Some partially enclosed shock assemblies for caster wheels have been developed to provide shock absorption between the caster wheels and the component to which it is attached, though these shock assemblies have not been used for zero-turn mowers and are not fully enclosed. For example, some of these caster wheel shock assemblies provide openings through which a guide rod may slide, therefore allowing foreign contaminants to enter through said openings as the guide rod slides outward and inward therethrough.

SUMMARY

The present invention solves some of the above-described problems and provides a distinct advance in the art of zero-turn mower shock absorption. Embodiments of the present invention provide a zero-turn mower comprising a zero-turn mower frame, a first caster wheel assembly, a second caster wheel assembly, and a front suspension system connecting the caster wheel assemblies to the frame. The front suspension system may comprise a floating front axle pivotably connected to the zero-turn mower frame, a first shock assembly rotatably and telescopically connecting the first caster wheel assembly to a first end of the floating front providing vertical shock absorption therebetween, and a second shock assembly rotatably and telescopically connecting the second caster wheel assembly to a second end of the floating front axle and providing vertical shock absorption therebetween.

The shock assemblies may each comprise an outer member and an inner member at least partly disposed in the outer member and may cooperatively define an internal spring-receiving chamber in which a compression spring may be received. The spring may bias the inner and outer members away from one another. The outer member may be rigidly coupled to the axle and the inner member may be rigidly coupled to one of the first or second caster wheel assemblies, with the inner and outer members being rotatably and telescopically coupled with each other. The spring-receiving chamber may be substantially isolated from the environment external to the first and second shock assemblies. The shock assemblies may also each comprise a retention rod extending through the center of the spring for limiting movement of the outer and inner members away from one another.

In use, an operator may drive a zero-turn mower over a surface comprising a bump and may pass a first front wheel of the zero-turn mower over the bump without passing a second front wheel of the zero-turn mower over the bump, causing substantially equal compressive force on a first shock assembly associated with the first front wheel and a second shock assembly associated with the second front wheel, and causing an axle coupled to the first and second shock absorbers to rotate a first end of the axle proximate the first wheel upward and a second end of the axle proximate the second wheel downward.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

Figure 1:
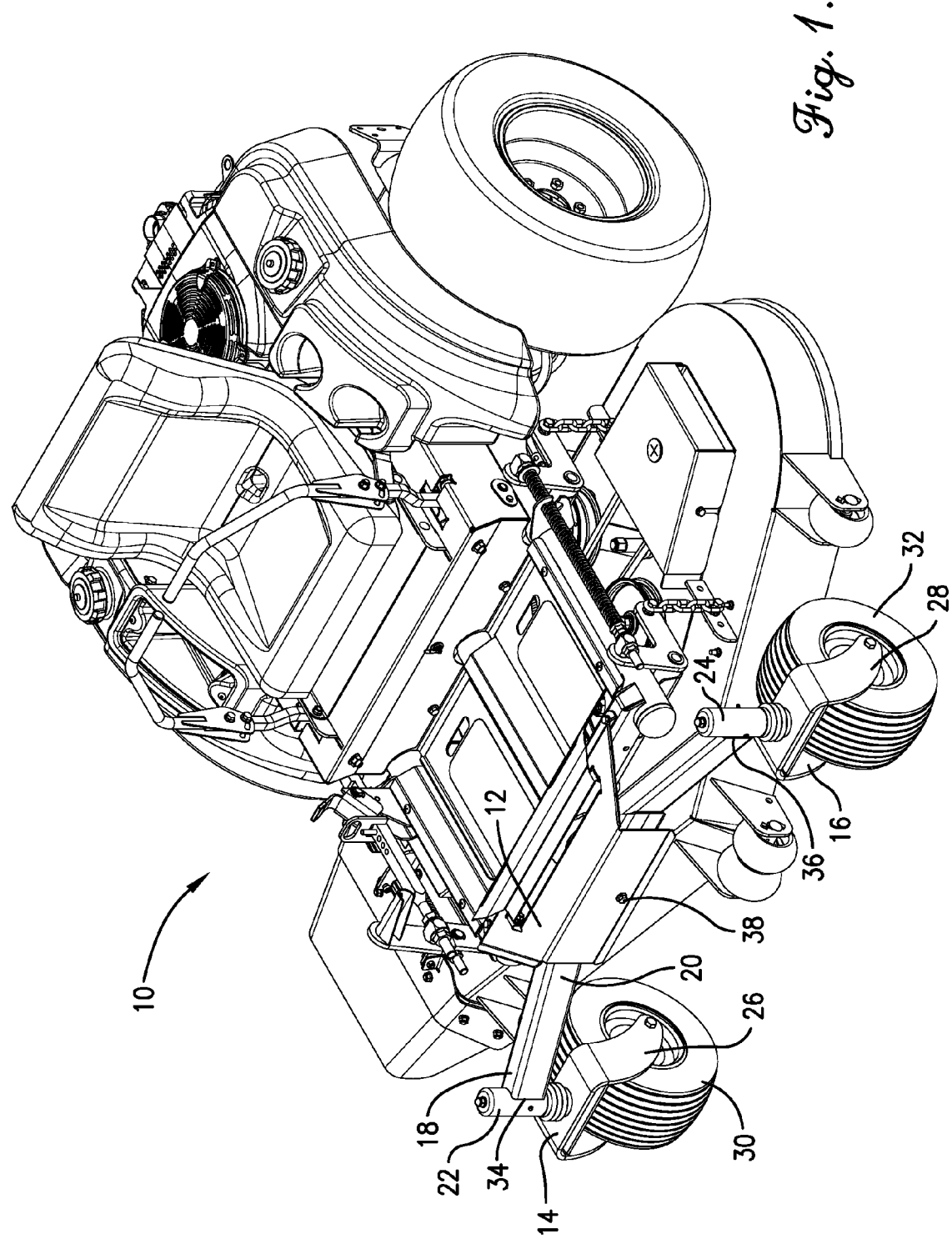
FIG. 1 is a perspective view of a zero-turn mower constructed according to an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
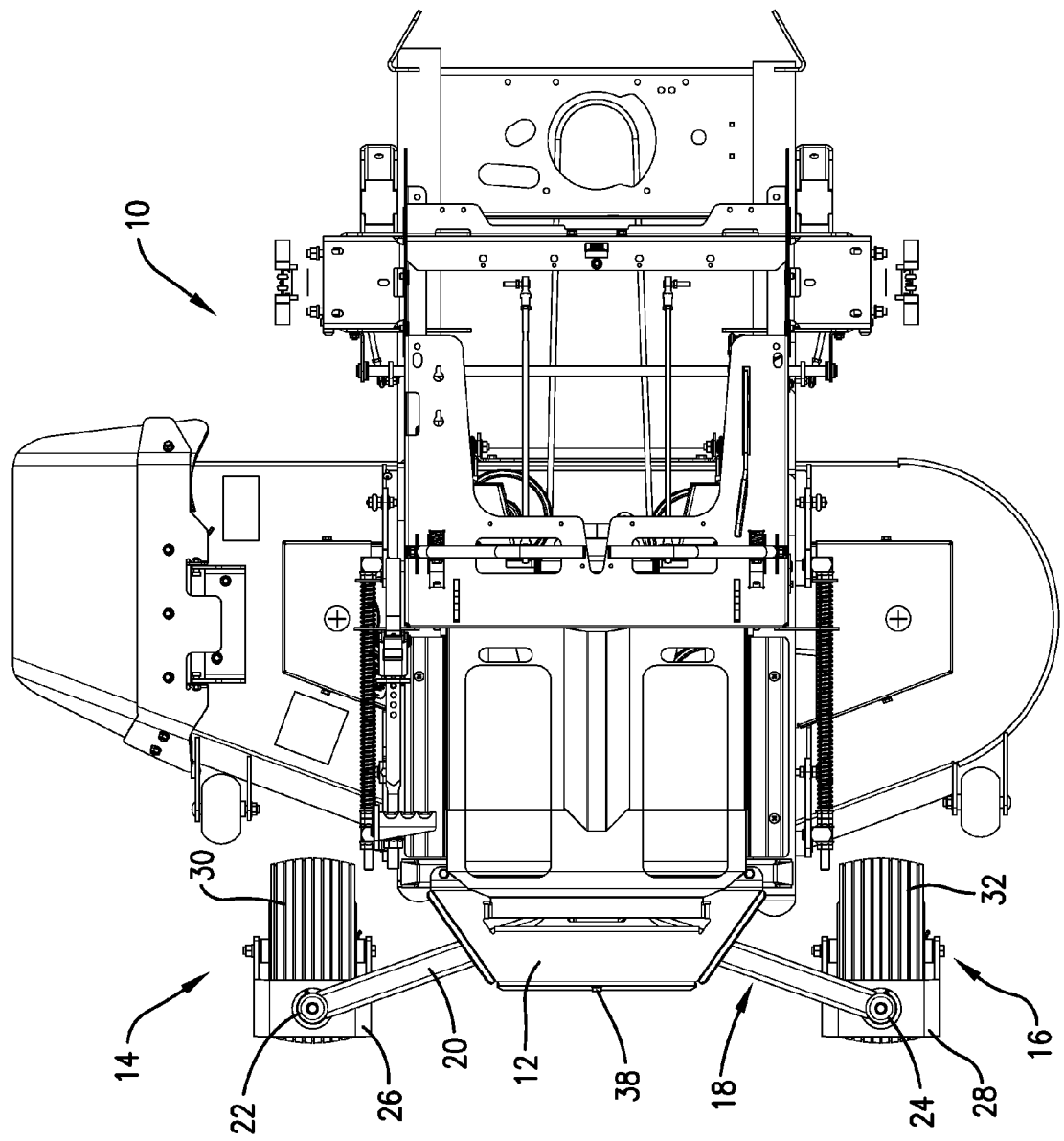
FIG. 2 is a plan view of the zero-turn mower of FIG. 1.

FIGS. 1 and 2 show a zero-turn mower 10 comprising a zero-turn mower frame 12, a first caster wheel assembly 14, a second caster wheel assembly 16, and a front suspension system 18 connecting the first and second caster wheel assemblies 14,16 to the mower frame 12. The front suspension system 18 comprises a pivotable floating front axle 20, a first shock assembly 22 attaching the first caster wheel assembly 14 to the front axle 20 and configured for vertical shock absorption, and a second shock assembly 24 attaching the second caster wheel assembly 16 to the front axle 20 and configured for vertical shock absorption. The combination of the pivoting provided by front axle 20 and vertical shock absorption provided by the first and second shock assemblies 22, 24 allows the zero-turn mower 10 to pass over a bump or dip in the ground with minimal effect on the zero-turn mower frame 12, as later described herein.

The first and second caster wheel assemblies 14, 16 may comprise a first and second fork 26,28 respectively and a first and second wheel 30,32 respectively. The wheels 30,32 may be rotatably attached to the forks 26,28 and may rotate around a horizontal axis substantially parallel to the ground. The forks 26,28 may be formed of metal or any other substantially rigid material and may be fixedly coupled to the first or second shock assembly 22,24. The wheels 30,32 may be formed of any combination of rubber, metal, plastic, and the like.

The floating front axle 20 may be formed of a rigid body and may comprise a first end 34, a second end 36 located opposite of the first end 34, and a pivot point 38 at which the axle 20 is pivotably attached to the mower frame 12 using any pivotable connection means known in the art. The pivot point 38 may be a point or region of the axle 20 located and/or centered between the first and second ends 34,36. The front axle 20 may pivot freely (i.e., without being biased towards a particular position) relative to the frame 12 in a substantially vertical manner, up and down, toward and away from the ground about a substantially horizontal axis substantially parallel to the ground. In some embodiments of the invention, the front axle 20 may be prevented from pivoting in a substantially horizontal manner, right to left, about a vertical axis substantially perpendicular with the ground.

The first and second shock assemblies 22,24 may each be configured to provide vertical shock absorption. The first shock assembly 22 may rotatably couple the first caster wheel assembly 14 to the first end 34 of the floating front axle 20 and the second shock assembly 24 may rotatably couple the second caster wheel assembly 16 to the second end 36 of the floating front axle 20.

Figure 3:
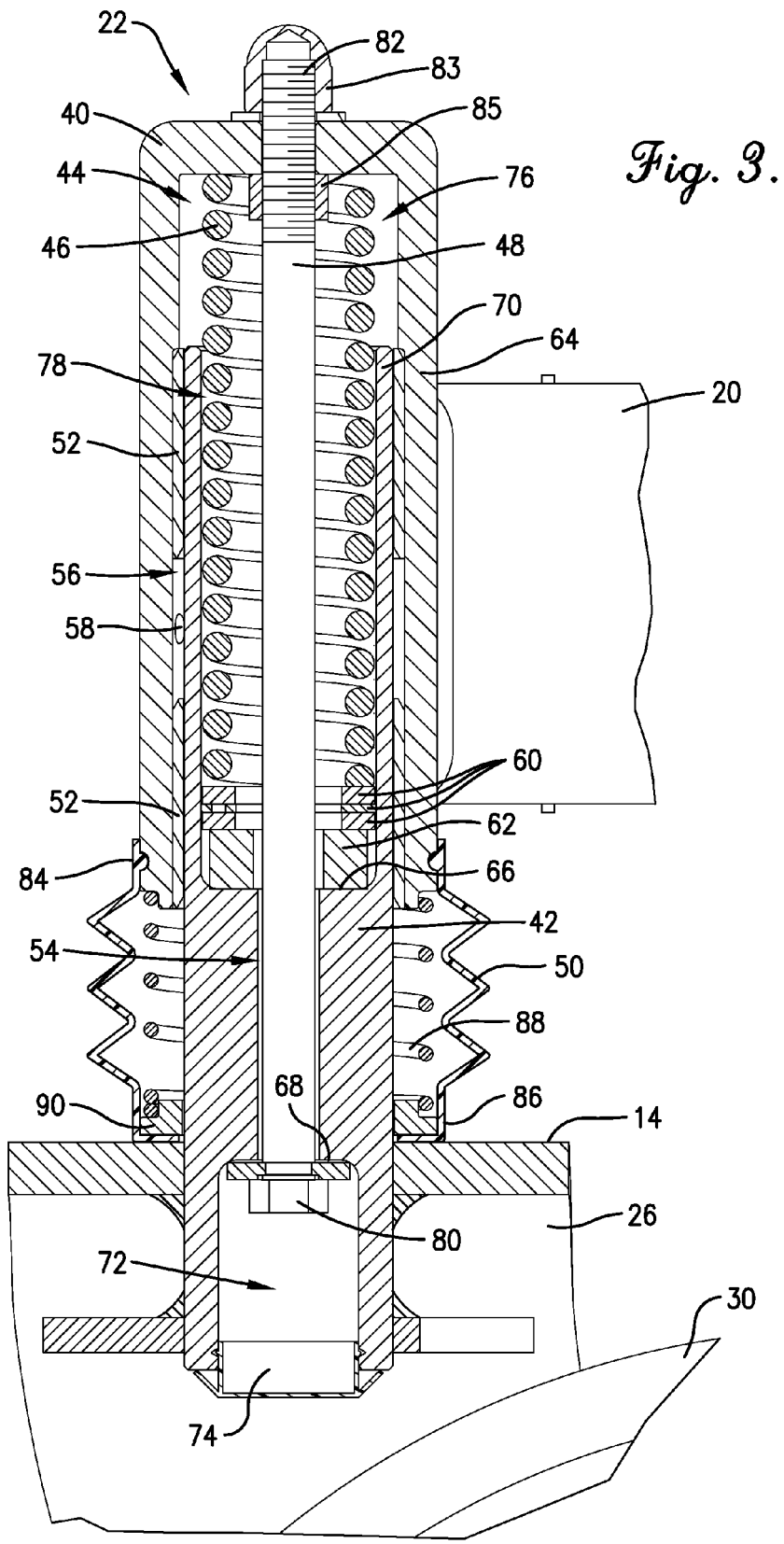
FIG. 3 is a fragmentary cross-sectional view of a shock assembly of the zero-turn mower of FIG. 1 in a fully extended position.
Figure 4:
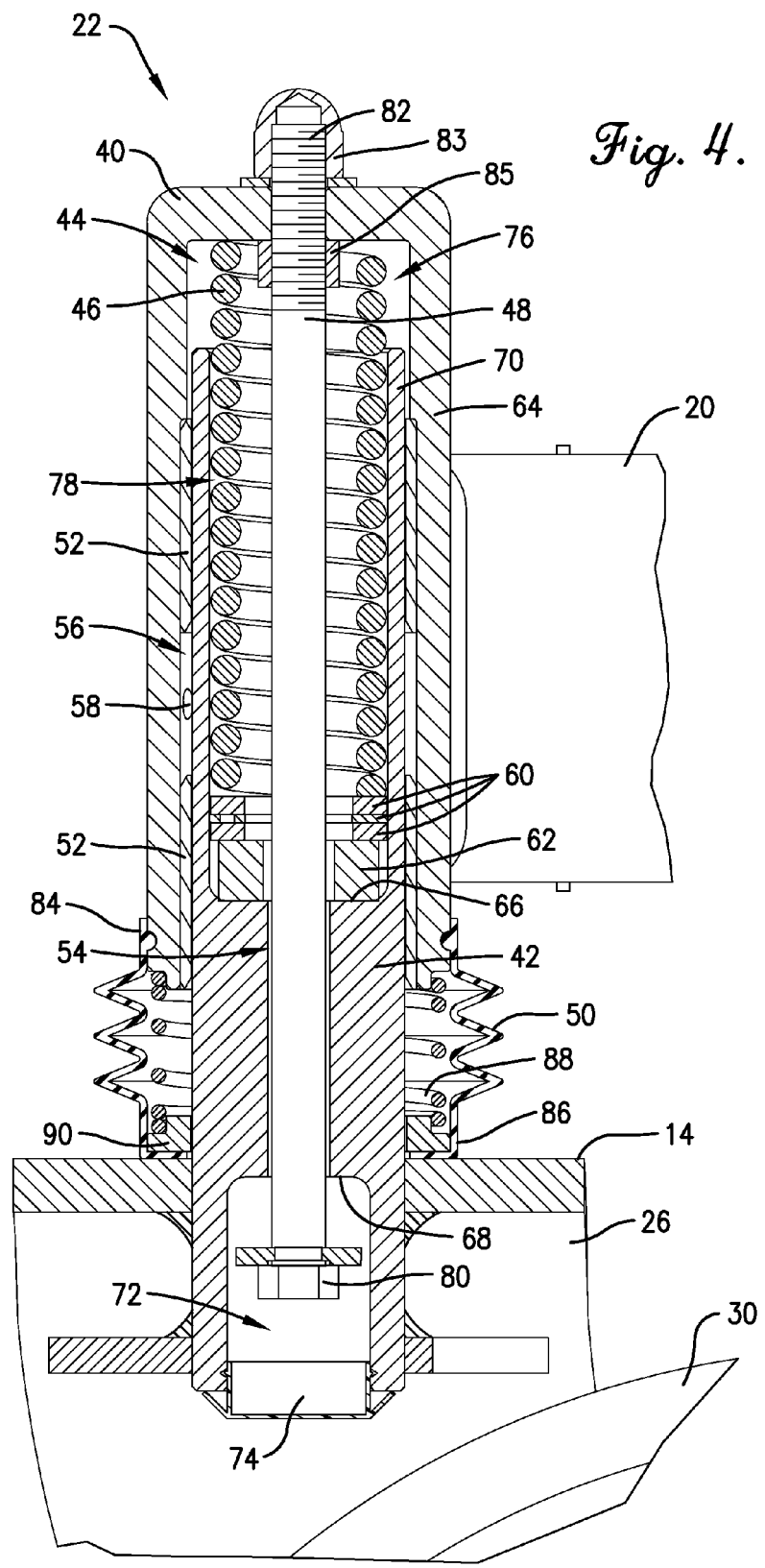
FIG. 4 is a fragmentary cross-sectional view of the shock assembly of FIG. 3 in a compressed position.

The shock assemblies 22,24 are depicted in detail in FIGS. 3 and 4. Though FIGS. 3 and 4 only illustrate the first shock assembly 22, the first and second shock assemblies 22,24 may be substantially identical in configuration and may comprise the same components, as described herein. As depicted in FIGS. 3 and 4, each of the shock assemblies 22,24 may comprise an outer member 40 fixed to the floating front axle 20 and an inner member 42 rotatably and/or telescopically connected to the outer member 40 and fixedly attached to the first or second fork 26,28. The outer and inner members 40,42 may cooperatively form an internal spring-receiving chamber 44.

The shock assemblies 22,24 may each further comprise a compression spring 46 housed within the internal spring-receiving chamber 44 and a retention rod 48 extending through the center of the spring 46. The shock assemblies 22,24 may also comprise a thrust bearing 60 disposed within the spring-receiving chamber 44 and between a lower end of the spring 46 and an elastomeric pad 62 that contacts an interior flange 66 of the inner member 42. Furthermore, the shock assemblies 22,24 may comprise a flexible bellows 50 extending between the bottom of the outer member 40 and the top of the first or second fork 26,28; one or more bushings 52, housed between the outer and inner members 40,42 to facilitate rotation and telescoping therebetween; a lubricant space 56 cooperatively defined by the outer and inner members 40,42 and the bushing(s) 52; and a lubricant inlet 58 formed in the outer member 40 to insert lubricant into the lubricant space 56.

The outer member 40 may be a rigid hollow part of any shape and configuration, such as a cylinder substantially closed at one end, and may comprise a sidewall 64. The space within the hollow outer member 40 may be referred to herein as a first interior space 76. The inner member 42 may be a rigid hollow part of any shape and configuration, such as a cylinder, and may comprise a sidewall 70. The outside diameter of the inner member sidewall 70 may be smaller than the inside diameter of the outer member sidewall 64, such that the inner member 42 may axially slide up and down within the outer member 40.

The large space defined within the upper portion of the hollow inner member 42 may be referred to herein as a second interior space 78. The second interior space 78 and the first interior space 76 cooperatively form the internal spring-receiving chamber 44. The smaller space defined near the bottom of the inner member 42 may be referred to herein as a rod travel space 72. The inner member 42 may comprise a cap 74 covering an open end of the rod travel space 72 and/or configured to substantially seal the rod travel space 72 from the external environment at the lower end of the inner member 42.

The compression spring 46 is operable to bias the outer member 40 away from the inner member 42. The compression spring 46 may be made of any compressible, resilient material and may reside within the internal spring-receiving chamber 44. In one embodiment of the invention, the compression spring 46 may be an elongated piece of metal coiled or spiraled in a uniform manner. The minimum and maximum length of the compression spring 46 when it is compressed and extended respectively may be based on the desired amount of shock absorption travel for each of the first and second shock assemblies 22,24. A maximum width or diameter of the cylindrically-coiled compression spring 46 may be approximately equal to and/or slightly smaller than the first cross-sectional diameter of the second interior space 78.

One end of the compression spring 46 may be fixedly attached to the outer member 40 or the inner member 42. In the embodiment illustrated in FIGS. 3 and 4, the upper end of the compression spring 46 is fixedly attached to the closed end of the outer member 40, while the lower end of the compression spring 46 pushes against the upwardly-facing interior flange 66 of the inner member 42. As shown in FIGS. 3 and 4, the thrust bearing 60 and elastomeric pad 62 may be positioned between the spring 46 and the first interior flange 66 to allow rotation of the inner member 42 relative to the spring 46 and the outer member 40. The thrust bearing 60 depicted in FIGS. 3 and 4 is a three-component thrust assembly consisting of a plastic thrust washer sandwiched between two steel outboard races.

The retention rod 48 may be configured for limiting movement of the outer and inner members 40,42 away from one another. The retention rod 48 may be made of any substantially rigid material and may extend through and along a center axis of the outer member 40, the inner member 42, the compression spring 46, the thrust bearing 60, and/or the elastomeric pad 62. The thrust bearing 60 and the elastomeric pad 62 may each comprise holes located through the center thereof with a diameter at least slightly greater than the diameter of the retention rod 48. Additionally, the retention rod 48 may have a diameter slightly smaller than the cross-sectional diameter of an intermediate space 54 extending between the second interior space 78 and the travel rod space 72. In some embodiments of the invention, the upper end of the retention rod 48 may be attached to the outer member 40. For example, the retention rod 48 may comprise screw threads 82 at one end to fixedly attach to the outer member 40 via an outer nut 83 and an inner nut 85. More specifically, in the embodiment depicted in FIGS. 3 and 4, the upper threaded end of the retention rod 48 extends through an opening in the upper end of the outer member 40 and is rigidly secured to the outer member 40 by tightening the outer nut 83 and thereby compressing the upper end of the outer member 40 between the outer and inner nuts 83,85. Furthermore, the lower end of the retention rod 48 may have a retention rod head 80 attached or integrally formed thereon. The retention rod head 80 may have a width or diameter slightly smaller than the cross-sectional diameter of the rod travel space 72 but larger than the cross-sectional diameter of the intermediate space 54, such that the retention rod head 80 rests on a downwardly-facing interior flange 68 of the inner member 42 when the compression spring 46 is extended to its maximum allowed length. Thus, the maximum extension length of the compression spring 46 is limited by the length of the retention rod 48, the location of the interior flange 68, and/or the distance of the retention rod head 80 relative to the point at which the compression spring 46 attaches to the outer member 40.

The flexible bellows 50 may comprise an upper end 84 fixedly coupled to the outer member 40 and a lower end 86 disposed around the inner member 42 and permitting rotation of the inner member 42 relative to the bellows 50. The bellows 50 may be pleated or otherwise configured for expansion and compression. A bellows hold-down ring 90 attached to, within, and/or positioned at the bottom of the bellows 50 may be configured to maintain contact between the bellows 50 or the bellows hold-down ring 90 and the first or second fork 26,28 regardless of the vertical movement between the inner and outer members 40,42 while still allowing the first or second fork 26,28 and the inner member 42 to rotated relative to the bellows 50 and the bellows hold-down ring 90. For example, the bellows hold-down ring 90 may be sufficiently heavy to maintain contact with the first or second fork 26,28 or the bellows hold-down ring 90 may be a thrust bearing. The bellows 50 shields the inner member 42 and the spring 46 from the external environment, protecting them from foreign particles, dirt, and/or grass.

The flexible bellows 50 may also house a bellows spring 88 coiled around and outward of the inner member 42 and fixed to the lower end of the outer member 40. The lower end of the bellows spring 88 may contact and exert a downward force on the bellows hold-down ring 90. The bellows spring 88 may assist in maintaining the integrity of the bellows 50 and may function to maintain contact between the bottom of the bellows 50 and the top of the forks 26,28 as the forks 26,28 move relative to the outer member 40.

The bushing 52 is disposed between the inner and outer members 40,42 and is configured to provide a low-friction surface for smooth rotation and telescoping vertical movement between the outer and inner members 40,42. In some embodiments of the invention, only one bushing 52 is used, while in other embodiments of the invention, two or more bushings may be used. The lubricant space 56 defined by a void in the bushing 52 may be configured such that lubricant may be placed therein. The lubricant inlet 58 may be formed in the sidewall 64 of the outer member 40 and configured to provide an opening through which the lubricant may be inserted. The lubricant inlet 58 may be positioned in fluid communication with the lubricant space 56, such that lubricant passed through the lubricant inlet 58 subsequently passes into the lubricant space 56. The lubricant may spread from the lubricant space 56 along the inner surface of the outer member sidewall 64 and the outer surface of the inner member sidewall 70 and may be contained within the first or second shock assemblies 22,24 by the bellows 50 and/or the bellows hold-down ring 90.

Figure 5:
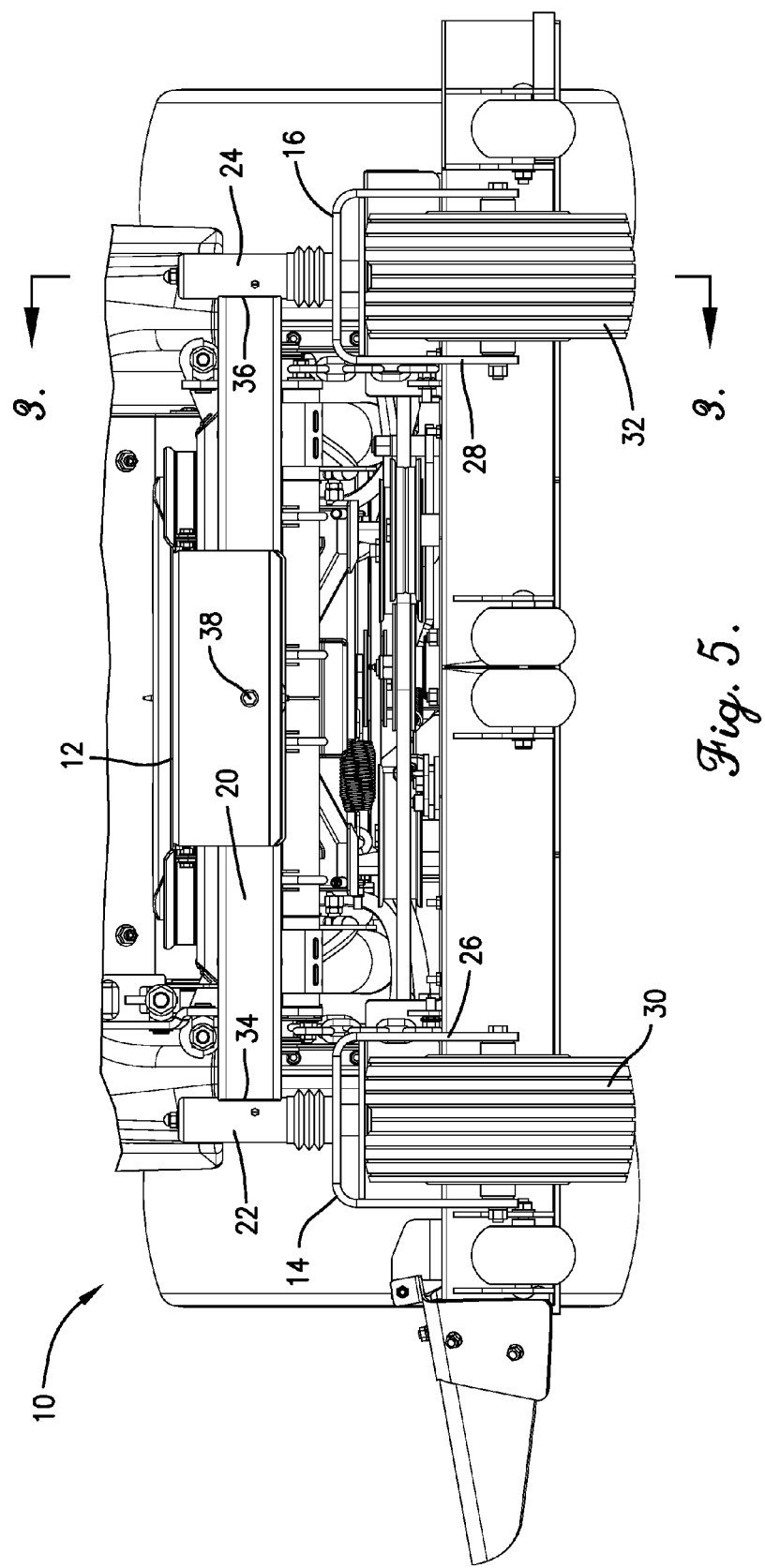
FIG. 5 is a fragmentary elevation view of the zero-turn mower of FIG. 1 positioned on level ground.
Figure 6:
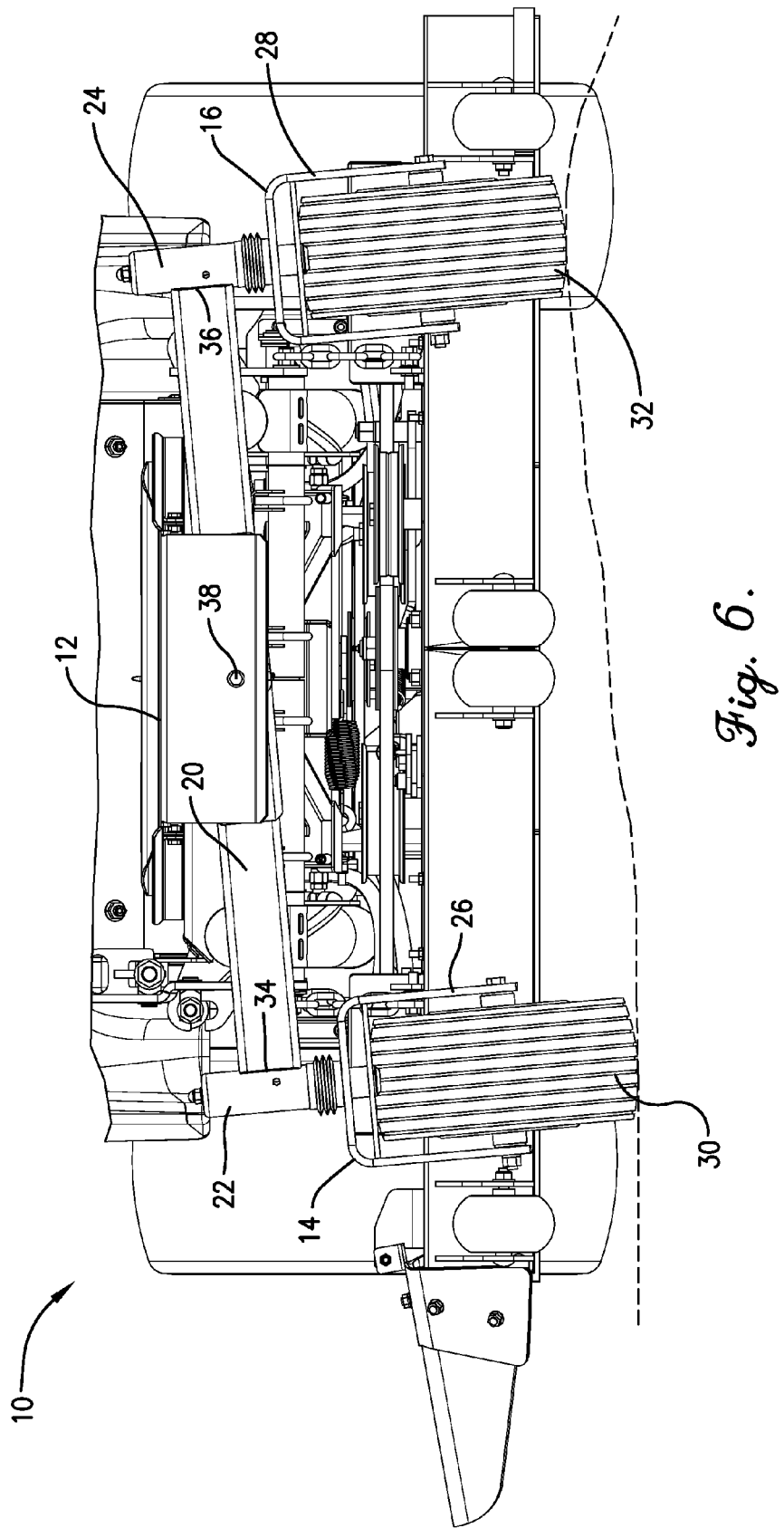
FIG. 6 is a fragmentary elevation view of the zero-turn mower of FIG. 1 positioned on uneven ground.

In use, the zero-turn mower 10 may be driven over level terrain as in FIG. 5 or uneven terrain as in FIG. 6. For example, the zero-turn mower 10 may drive over a surface comprising a bump, as illustrated in FIG. 6, and pass the first wheel 30 over the bump without passing the second wheel 32 over the bump, thereby causing substantially equal compressive force on the first shock assembly 22 and the second shock assembly 24. Specifically, passing the first wheel 30 over the bump without passing the second wheel 32 over the bump may cause the axle 20 to rotate the first end 34 of the axle 20 upward and the second end 36 of the axle 20 downward. Additionally or alternatively, the surface may comprise a dip and the mower 10 may drive over the surface, passing the first wheel 30 over the dip without passing the second wheel 32 over the dip, thereby causing substantially equal extension of the first shock assembly 22 and the second shock assembly 24. The pivoting motion of the axle 20 combined with the vertical shock absorption of the shock assemblies 22,24 provides better weight distribution and shock absorption than either component could provide on its own.

For example, if the first wheel 30 passes over a bump that is two inches higher than the surface over which the second wheel 32 is passing over, the first shock assembly 22 may experience approximately one inch of compression while the first end 34 of the axle 20 may rotate upward approximately one inch. Simultaneously, the second end 36 of the axle 20 may respond by rotating downward approximately one inch, which subsequently may cause the second shock assembly 24 to compress by approximately one inch. Advantageously, the rotation of the axle 20 allows for equal amounts of compression on each of the shock assemblies 22,24. By equally distributing the compressive or expansive forces across the two shock assemblies 22,24, neither shock assembly is subject to as great an expansion or compression as would otherwise be experienced in this situation, allowing for a generally smoother ride on the zero-turn mower 10 and less wear and tear on its parts.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A zero-turn mower comprising:
   a zero-turn mower frame;
   a floating front axle having a first end and a second end, wherein the floating front axle is pivotally coupled to the zero-turn mower frame at a point between the first and second ends of the floating front axle;
   a first caster wheel assembly;
   a second caster wheel assembly;
   a first shock assembly rotatably coupling the first caster wheel assembly to the first end of the floating front axle, wherein the first shock assembly is configured for vertical shock absorption; and
   a second shock assembly rotatably coupling the second caster wheel assembly to the second end of the floating front axle, wherein the second shock assembly is configured for vertical shock absorption.

2. The zero-turn mower of claim 1, wherein the floating front axle is formed of a rigid body pivotally coupled to the mower at a location centered between the first and second ends of the axle.

3. The zero-turn mower of claim 1, wherein the floating front axle is configured to pivot freely relative to the frame on a substantially horizontal pivot axis.

4. The zero-turn mower of claim 1, wherein the floating axle is configured to pivot relative to the frame on a substantially horizontal pivot axis but not on a vertical pivot axis.

5. The zero-turn mower of claim 1, wherein the first and second caster wheel assemblies each comprise:
 a fork fixedly coupled to at least a portion of the first or second shock assembly; and
 a wheel rotatably attached to the fork.

6. The zero-turn mower of claim 1, wherein the shock assemblies each comprise:
 an outer member;
 an inner member at least partly disposed in the outer member, wherein the inner and outer members cooperatively define an internal spring-receiving chamber; and
 a compression spring received in the spring-receiving chamber and operable to bias the inner and outer members away from one another.

7. The zero-turn mower of claim 6, wherein the outer member is rigidly coupled to the axle and the inner member is rigidly coupled to one of the first or second caster wheel assemblies.

8. The zero-turn mower of claim 6, wherein the spring-receiving chamber is substantially isolated from the environment external to the first and second shock assemblies.

9. The zero-turn mower of claim 6, wherein the outer and inner members are telescopically and rotatably intercoupled.

10. The zero-turn mower of claim 6, wherein the shock assemblies each comprise a retention rod for limiting movement of the outer and inner members away from one another.

11. The zero-turn mower of claim 10, wherein the retention rod extends through the center of the spring.

12. A zero-turn mower comprising:
 a zero-turn mower frame;
 a pair of front caster wheels; and
 a front suspension system coupling the caster wheels to a front axle,
 wherein the front suspension system comprises a pair of shock assemblies each coupled to a respective caster wheel,
 wherein each shock assembly comprises an outer member, an inner member, and a compression spring,
 wherein the inner and outer members are telescopically and rotatably intercoupled,
 wherein the inner and outer members cooperatively define an internal spring-receiving chamber within which the spring is received for biasing the inner and outer members away from one another,
 wherein the spring-receiving chamber is substantially isolated from the environment external to the shock assemblies.

13. The zero-turn mower of claim 12, wherein the outer member comprises a first sidewall and the inner member comprises a second sidewall, wherein the shock assemblies each comprise a bushing between the first and second sidewalls for facilitating telescopic and rotational movement of the inner and outer members relative to one another.

14. The zero-turn mower of claim 13, wherein the outer member defines a first interior space and the inner member defines a second interior space, wherein the first and second interior spaces cooperatively form the spring-receiving chamber.

15. The zero-turn mower of claim 14, wherein the first sidewall, second sidewall, and bushing cooperatively define a lubricant space between the first and second sidewalls, wherein the first sidewall defines a lubricant inlet that communicates with the lubricant space.

16. The zero-turn mower of claim 12, wherein the shock assemblies each comprise a thrust bearing disposed in the spring-receiving chamber between one end of the spring and one of the inner and outer members for facilitating rotation of said one of the inner and outer members relative to the spring.

17. The zero-turn mower of claim 16, wherein the opposite end of the spring is fixed to the other of the inner and outer members.

18. The zero-turn mower of claim 12, wherein the shock assemblies each comprise a retention rod for limiting movement of the outer and inner members away from one another.

19. The zero-turn mower of claim 18, wherein the retention rod is fixedly coupled to one of the inner and outer members but permits movement of the other of the inner and outer members relative thereto, and wherein the retention rod extends through the center of the spring.

20. The zero-turn mower of claim 12, wherein the shock assemblies each include a flexible bellows having a first end fixedly coupled to the outer member and a second end disposed around the inner member and permitting rotation of the inner member relative to the bellows.

21. The zero-turn mower of claim 20, wherein the shock assemblies each include a bellows spring and a bellows hold-down ring, wherein the bellows hold-down ring is fixedly coupled to the second end of the bellows and extends around the inner member while permitting rotation of the inner member relative to the bellows, wherein said bellows spring contacts and extends between the outer member and the hold-down ring.

22. The zero-turn mower of claim 12, wherein the front axle comprises a floating front axle that is pivotally coupled to the frame in a manner that permits pivoting of the front axle relative to the frame on a substantially horizontal pivot axis, wherein the shock assemblies are coupled to the front axle on opposite sides of the pivot axis.

23. The zero-turn mower of claim 22, wherein the outer member is rigidly coupled to the front axle and the inner member is coupled to one of the front caster wheels.

24. A zero-turn mower comprising:
 a zero-turn mower frame;
 a pair of front caster wheels; and
 a front suspension system coupling the caster wheels to a front axle,
 wherein the front suspension system comprises a pair of shock assemblies each coupled to a respective caster wheel,
 wherein each shock assembly comprises an outer member and an inner member,
 wherein the outer member comprises a first sidewall and the inner member comprises a second sidewall, wherein the shock assemblies each comprise a bushing between the first and second sidewalls for facilitating telescopic or rotational movement of the inner and outer members relative to one another.

25. The zero-turn mower of claim 24, wherein each shock assembly further comprises a compression spring, wherein the inner and outer members cooperatively define an internal spring-receiving chamber within which the spring is received for biasing the inner and outer members away from one another, wherein each shock assembly further comprises a flexible bellows coupled to at least one of the inner and outer members and operable to substantially isolate the spring-receiving chamber from the environment external to the shock assemblies.

26. The zero-turn mower of claim 24, wherein the front axle comprises a floating front axle that is pivotally coupled to the frame in a manner that permits pivoting of the front axle relative to the frame on a substantially horizontal pivot axis, wherein the shock assemblies are coupled to the front axle on opposite sides of the pivot axis.

\* \* \* \* \*